US012037967B2

(12) United States Patent
Phillips et al.

(10) Patent No.: US 12,037,967 B2
(45) Date of Patent: Jul. 16, 2024

(54) FUEL INJECTOR HAVING NOZZLE SPRAY HOLES WITH GROOVES

(71) Applicant: Cummins Inc., Columbus, IN (US)

(72) Inventors: Ross A. Phillips, Columbus, IN (US); Jordan P. Steele, Franklin, IN (US); Frank Husmeier, Columbus, IN (US); Bryan D. Rollin, Mooresville, IN (US)

(73) Assignee: Cummins Inc., Columbus, IN (US)

( * ) Notice: Subject to any disclaimer, the term of this patent is extended or adjusted under 35 U.S.C. 154(b) by 21 days.

(21) Appl. No.: 17/381,251

(22) Filed: Jul. 21, 2021

(65) Prior Publication Data

US 2022/0056874 A1 Feb. 24, 2022

Related U.S. Application Data

(60) Provisional application No. 63/067,527, filed on Aug. 19, 2020.

(51) Int. Cl.

| | |
|---|---|
| ***F02M 61/16*** | (2006.01) |
| ***B05B 1/34*** | (2006.01) |
| ***F02M 53/04*** | (2006.01) |
| ***F02M 61/18*** | (2006.01) |

(52) U.S. Cl.

CPC ........... *F02M 53/04* (2013.01); *B05B 1/3405* (2013.01); *F02M 61/163* (2013.01); *F02M 61/18* (2013.01); *F02M 61/1846* (2013.01)

(58) Field of Classification Search

CPC ............. F02M 61/163; F02M 61/1846; F02M 61/162; A02M 61/162; A02M 61/163

See application file for complete search history.

(56) References Cited

U.S. PATENT DOCUMENTS

| | | | | |
|---|---|---|---|---|
| 2,235,365 | A * | 3/1941 | Grumbt | F02M 61/045 239/584 |
| 5,029,759 | A * | 7/1991 | Weber | B23H 9/14 239/533.2 |
| 5,785,254 | A * | 7/1998 | Zimmermann | F02M 61/186 239/585.4 |
| 6,105,884 | A * | 8/2000 | Molnar | F02M 51/0667 137/625.33 |
| 7,077,341 | B2 * | 7/2006 | Kwak | F02M 61/162 239/533.14 |
| 7,237,768 | B1 * | 7/2007 | Scott | F02M 29/06 123/298 |
| 10,961,967 | B1 * | 3/2021 | Schmitz | F02M 61/1833 |
| 11,524,455 | B2 * | 12/2022 | Zehavi | B29C 64/25 |

(Continued)

FOREIGN PATENT DOCUMENTS

| | | | |
|---|---|---|---|
| DE | 19843895 | A1 | 3/2000 |
| DE | 102004044820 | A1 | 3/2006 |

(Continued)

*Primary Examiner* — Joseph A Greenlund

(74) *Attorney, Agent, or Firm* — Taft, Stettinius & Hollister LLP

(57) ABSTRACT

An injector includes a nozzle body extending along a longitudinal axis and at least one spray hole extending through a portion of the nozzle body to output a fluid from the injector. The spray hole includes at least one groove. The groove is configured to facilitate efficient mixing of the fluid with air or other surrounding materials for enhanced performance of the injector and/or other components associated with the injector.

18 Claims, 11 Drawing Sheets

(56) References Cited

U.S. PATENT DOCUMENTS

| | | | | |
|---|---|---|---|---|
| 11,525,416 | B2 * | 12/2022 | Mohammed | F02D 41/3845 |
| 11,738,356 | B2 * | 8/2023 | Short | B05B 1/20 239/533.1 |
| 2003/0111562 | A1 * | 6/2003 | Stier | F02M 61/1846 239/585.1 |
| 2003/0116659 | A1 * | 6/2003 | Sebastian | F02M 61/162 239/585.4 |
| 2005/0035223 | A1 * | 2/2005 | Kwak | F02M 61/162 239/533.12 |
| 2013/0233946 | A1 * | 9/2013 | Kobayashi | F02M 61/182 239/584 |
| 2013/0327851 | A1 * | 12/2013 | Kobayashi | F02M 61/162 239/489 |
| 2015/0048182 | A1 * | 2/2015 | Prociw | B05B 1/3426 239/466 |
| 2016/0169179 | A1 * | 6/2016 | Noguchi | F02M 61/162 239/518 |
| 2016/0356253 | A1 * | 12/2016 | Noguchi | F02M 61/1853 |
| 2017/0089313 | A1 * | 3/2017 | Noguchi | F02M 51/08 |
| 2019/0234361 | A1 * | 8/2019 | Dalmas | H04R 19/02 |
| 2020/0139390 | A1 * | 5/2020 | Thomson | F23R 3/14 |
| 2022/0056874 | A1 * | 2/2022 | Phillips | F02M 61/163 |
| 2022/0143633 | A1 * | 5/2022 | Stegmann | B05B 1/3046 |
| 2023/0243327 | A1 * | 8/2023 | Fitzgerald | F02B 23/0669 123/445 |

FOREIGN PATENT DOCUMENTS

| | | | | |
|---|---|---|---|---|
| FR | 2878583 | A1 | 6/2006 | |
| JP | H052724334 | * | 10/1993 | F02M 61/1833 |
| WO | 9733086 | A1 | 9/1997 | |
| WO | 2018036966 | A1 | 3/2018 | |

* cited by examiner

FUEL INJECTOR HAVING NOZZLE SPRAY HOLES WITH GROOVES

CROSS-REFERENCE TO RELATED APPLICATIONS

The present application is a Non-Provisional Application, which claims the benefit of U.S. Provisional Application No. 63/067,527, filed Aug. 19, 2020, the complete disclosure of which is expressly incorporated by reference herein.

FIELD OF THE INVENTION

The present disclosure relates to a fuel injector, and more particularly, to a fuel injector having spray holes configured with features for more efficiently mixing the fluid output by the spray holes with air or other fluids.

BACKGROUND OF THE DISCLOSURE

Fuel injectors are provided on combustion engines to control fuel flow during a fuel injection event when the engine is operating. Various embodiments of fuel injectors include a plurality of spray holes within the nozzle body of the fuel injector. The angle and flow of the fuel may be controlled based on parameters of the spray holes.

SUMMARY OF THE DISCLOSURE

In one embodiment, a method of forming a portion of a nozzle for an injector comprises providing a heating device, forming at least one spray hole within the nozzle, and forming, with the heating device, a groove in a helical configuration along an inner surface of at least a portion of the at least one spray hole.

In a further embodiment, an injector comprises a nozzle body and at least one spray hole extending through a portion of the nozzle body and configured to output a fluid from the nozzle body. The at least one spray hole includes at least four helical grooves.

In another embodiment, an injector comprises a nozzle body, a plurality of spray holes disposed within the nozzle body, and at least one rounded groove disposed along an inner surface of at least one of the plurality of spray holes.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Figure 1:
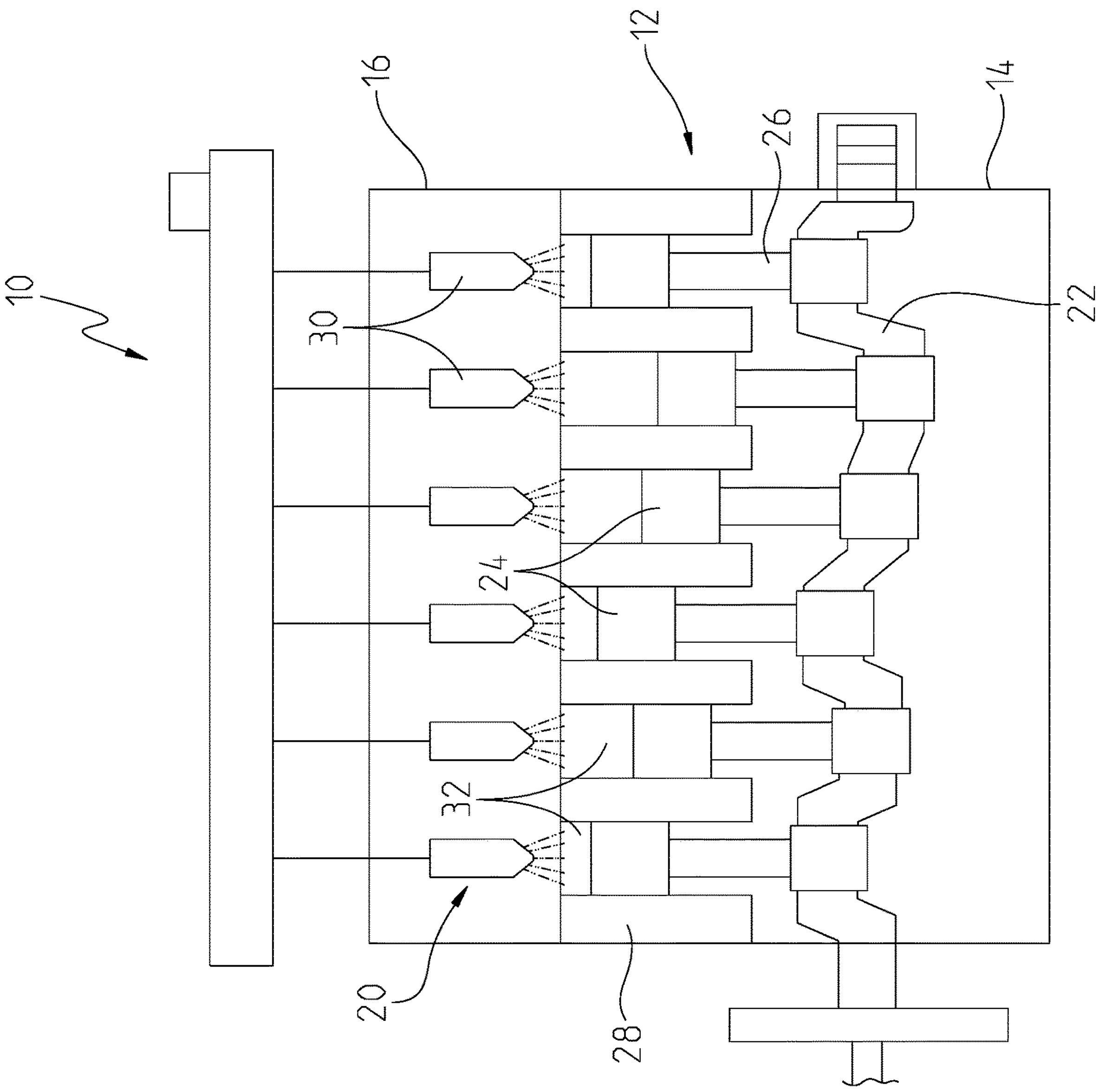
FIG. 1 is a schematic view of an internal combustion engine incorporating an illustrative embodiment of a fuel injector of the present disclosure.

Referring to FIG. 1, a portion of an internal combustion engine 10 is shown as a simplified schematic. Engine 10 includes an engine body 12, which supports an engine block 14, a cylinder head 16 coupled to engine block 14, and a fuel system 20. Engine body 12 further includes a crankshaft 22, a plurality of pistons 24, and a plurality of connecting rods 26. Pistons 24 are configured for reciprocal movement within a plurality of engine cylinders 28, with one piston 24 positioned in each engine cylinder 28. Each piston 24 is operably coupled to crankshaft 22 through one of connecting rods 26. A plurality of combustion chambers 32 are each defined by one piston 24, cylinder head 16, and cylinder 28. The movement of pistons 24 under the action of a combustion process in engine 10 causes connecting rods 26 to move crankshaft 22.

When engine 10 is operating, a combustion process occurs in combustion chambers 32 to cause movement of pistons 24. The movement of pistons 24 causes movement of connecting rods 26, which are drivingly connected to crankshaft 22, and movement of connecting rods 26 causes rotary movement of crankshaft 22. The angle of rotation of crankshaft 22 may be measured by the control system to aid in timing the combustion events in engine 10 and for other purposes. The angle of rotation of crankshaft 22 may be measured in a plurality of locations, including a main crank pulley (not shown), an engine flywheel (not shown), an engine camshaft (not shown), or on crankshaft 22.

Fuel system 20 includes a plurality of fuel injectors 30 positioned within cylinder head 16. Each fuel injector 30 is fluidly coupled to one combustion chamber 32. In operation, fuel system 20 provides fuel to fuel injectors 30, which is then injected into combustion chambers 32 by the action of fuel injectors 30, thereby forming one or more injection events or cycles. As detailed further herein, the injection cycle may be defined as the interval that begins with the movement of a nozzle or needle element to permit fuel to flow from fuel injector 30 into an associated combustion chamber 32, and ends when the nozzle or needle element moves to a position to block the flow of fuel from fuel injector 30 into combustion chamber 32.

Crankshaft 22 drives at least one fuel pump to pull fuel from the fuel tank in order to move fuel toward fuel injectors 30. A control system (not shown) provides control signals to fuel injectors 30 that determine operating parameters for each fuel injector 30, such as the length of time fuel injectors 30 operate and the number of fueling pulses per a firing or injection cycle period, thereby determining the amount of fuel delivered by each fuel injector 30.

In addition to fuel system 20, the control system controls, regulates, and/or operates other components of engine 10 that may be controlled, regulated, and/or operated through a control system (not shown). More particularly, the control system may receive signals from sensors located on engine 10 and transmit control signals or other inputs to devices located on engine 10 in order to control the function of such devices. The control system may include a controller or control module (not shown) and a wire harness (not shown). Actions of the control system may be performed by elements of a computer system or other hardware capable of executing programmed instructions, for example, a general purpose computer, special purpose computer, a workstation, or other programmable data processing apparatus. These various control actions also may be performed by specialized circuits (e.g., discrete logic gates interconnected to perform a specialized function), by program instructions (software), such as logical blocks, program modules, or other similar applications which may be executed by one or more processors (e.g., one or more microprocessors, a central processing unit (CPU), and/or an application specific integrated circuit), or any combination thereof. For example, embodiments may be implemented in hardware, software, firmware, middleware, microcode, or any combination thereof. Instructions may be in the form of program code or code segments that perform necessary tasks and can be stored in a non-transitory, machine-readable medium such as a storage medium or other storage(s). A code segment may represent a procedure, function, subprogram, program, routine, subroutine, module, software package, class, or any combination of instructions, data structures, or program statements. A code segment may be coupled to another code segment or a hardware circuit by passing and/or receiving information, data, arguments, parameters, or memory contents. In this way, the control system is configured to control operation of engine 10, including fuel system 20.

Figure 2:
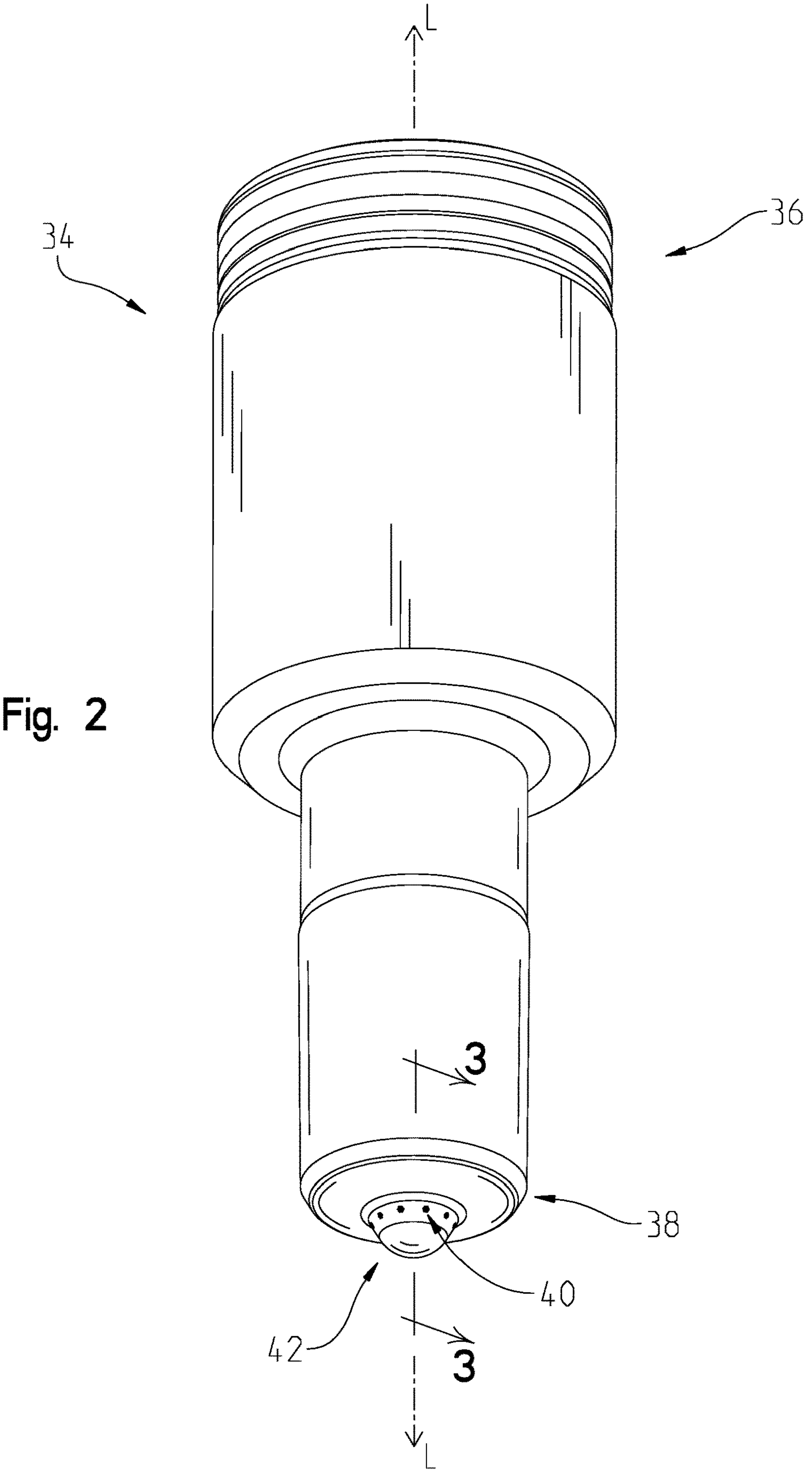
FIG. 2 is a perspective view of a nozzle body of the fuel injector of FIG. 1.

Referring to FIG. 2, fuel injector 30 includes a nozzle or valve body 34 having a proximal end 36 and a distal end 38. A plurality of spray holes 40 is positioned longitudinally (i.e., along longitudinal axis L) between proximal end 36 and distal end 38 of nozzle body 34. Distal end 38 of nozzle body 34 includes a nozzle sac or tip 42. Illustratively, spray holes 40 are spaced apart from each other along the entire circumference of nozzle sac 42. In various embodiments, spray holes 40 may be equally spaced apart from each other, however, in other embodiments, at least a portion of spray holes 40 may be closer to each other compared to others of spray holes 40. In other words, in various embodiments, spray holes 40 may be clustered together along a particular portion of nozzle sac 42. Additionally, spray holes 40 may be positioned in a plurality of rows, for example an upper row and a lower row, as disclosed further in U.S. Provisional Patent Application No. 62/983,999, filed Mar. 2, 2020, and entitled "FUEL INJECTOR HAVING MULTIPLE ROWS OF SPRAY HOLES WITH DIFFERENT CROSS-SECTIONAL SHAPES FOR FLOW MODULATION", the complete disclosure of which is expressly incorporated by reference herein. While the disclosure herein makes reference to fuel injector 30, it may be appreciated that all aspects of the disclosure may be suitable for use with any injector, such as a urea injector or doser, single-hole injectors or dosers, and any other device configured to output any fluid from one or more locations.

Figure 3:
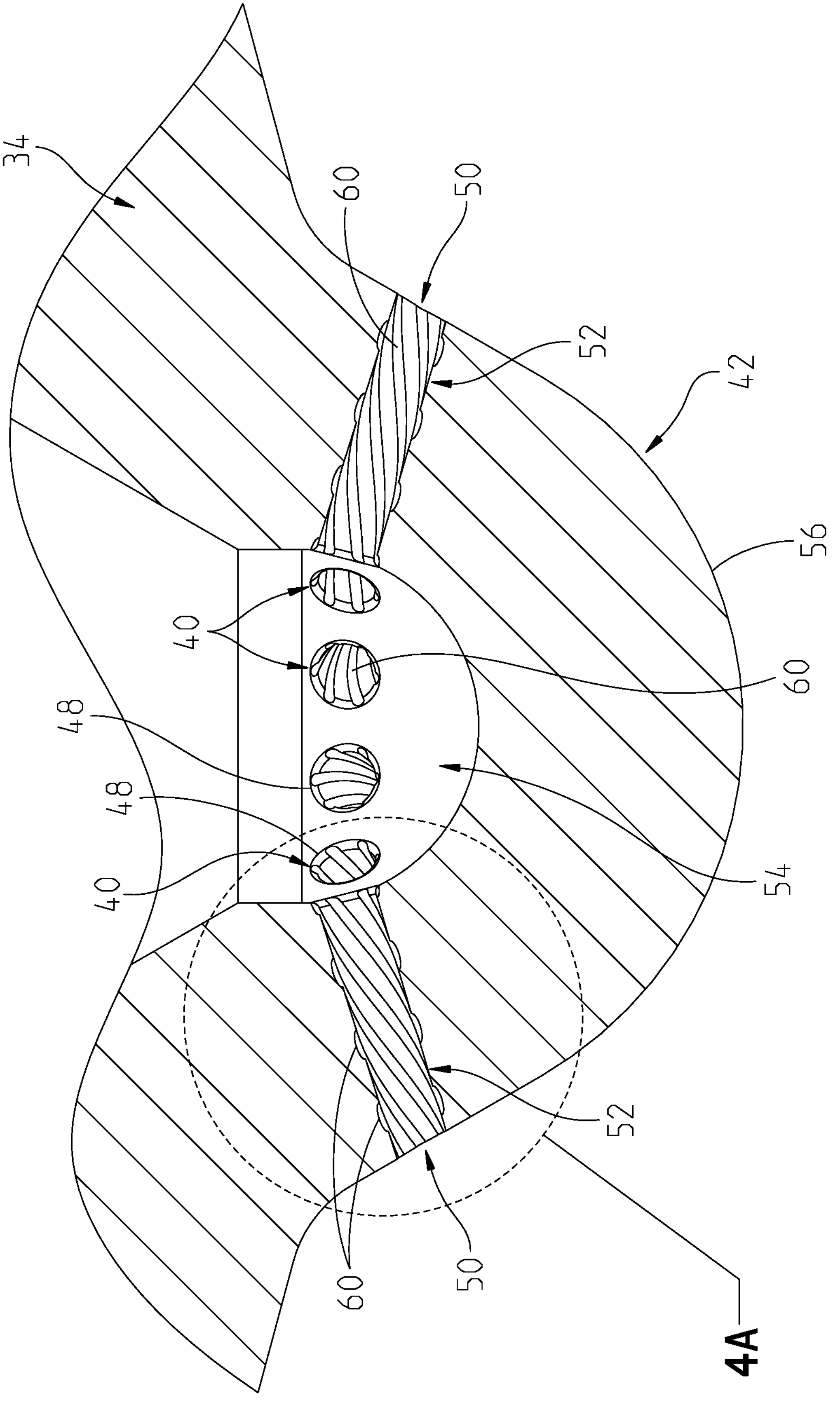
FIG. 3 is a cross-sectional view of a lower portion of the nozzle body of FIG. 2, taken along line 3-3 of FIG. 2.

As shown in FIG. 3, each spray hole 40 includes an inlet 48, an outlet 50, and a channel or flow passage 52 extending therebetween. Illustratively, inlet 48 is adjacent and open to an open volume 54 (configured to receive fuel or other fluids) of nozzle sac 42 while outlet 50 is positioned at and defines an opening of an outer or exterior surface 56 of nozzle sac 42. Channel 52 may be angled relative to longitudinal axis L (FIG. 2) and may be angled 0-90° relative to longitudinal axis L, depending on the application of fuel injector 30. The orientation of channel 52 may define the spray angle of spray hole 40 and spray holes 40 may have the same spray angle or may have different spray angles relative to each other.

Referring now to FIGS. 3-10, at least one spray hole 40 may include at least one groove 60. Illustratively, at least some of spray holes 40 include a plurality of grooves 60. In some embodiments, all of spray holes 40 have at least one groove 60; however, in other embodiments, at least one spray hole 40 includes at least one groove 60. Grooves 60 define recessed portions of channel 52. More particularly, spray hole 40 may be defined by a diameter D (e.g., 100 μm-300 μm) and grooves 60 extend into a portion of nozzle sac 42 by a distance or height h. In this way, distance h is less than diameter D but the sum of distance h and diameter D (i.e., D+h) defines the maximum measurement of channel 52 within nozzle sac 42. Further, grooves 60 may define a width w extending approximately perpendicularly to distance or height h.

Referring still to FIGS. 3-10, grooves 60 may have a generally rounded or curved cross-sectional shape extending from channel 52. Illustratively, grooves 60 may define a semi-circle in cross-section. However, grooves 60 may define any cross-sectional shape comprising linear or curved surfaces, such as rectangular cross-sectional shapes, triangular cross-sectional shapes, circular cross-sectional shape, elliptical cross-sectional shapes, etc.

As disclosed further herein, each groove 60 includes a first end 62 and a second end 64. The distance between first and second ends 62, 64 defines the length of groove 60. Groove 60 may extend in a helical or linear configuration between first and second ends 62, 64. In other embodiments, groove 60 extends in any configuration or pattern between first and second ends 62, 64.

Figure 4A:
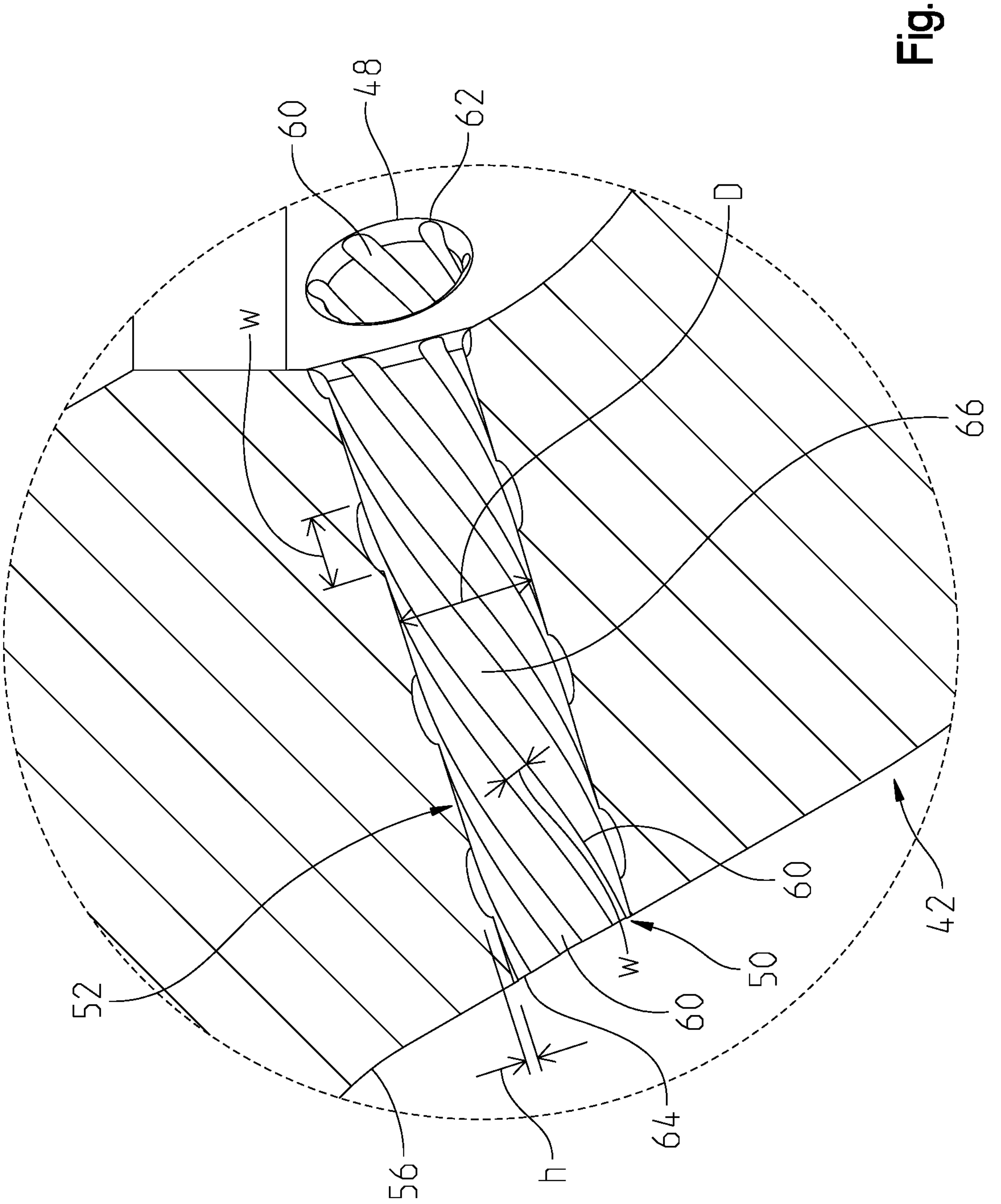
FIG. 4A is a detailed cross-sectional view of the nozzle body of FIG. 3 illustrating a plurality of grooves within a spray hole of the nozzle body.

FIGS. 3 and 4A disclose a first embodiment of grooves 60. More particularly, a plurality of grooves 60 extends along the entire length of channel 52 such that first end 62 of each groove 60 is generally coplanar with inlet 48 of spray hole 40 and second end 64 of each groove 60 is generally coplanar with outlet 50 of spray hole 40. In this embodiment, at least six grooves 60 are defined along channel 52 such that spray hole 40 defines at least six grooves 60 per 360° and grooves 60 may be spaced apart from each other by a land or non-recessed area 66 defining a portion of channel 52. The distance or height h of each groove 60 may be approximately 80-150 μm and, illustratively, may be approximately 120 μm. Additionally, width w of each groove 60 may be approximately 10-50 μm and, illustratively, may be approximately 20 μm. Grooves 60 may have a pitch, a distance between two points on a helix which are exactly one turn apart, of approximately 1.0-3.0 mm and, more particularly, approximately 1.8 mm.

Figure 4B:
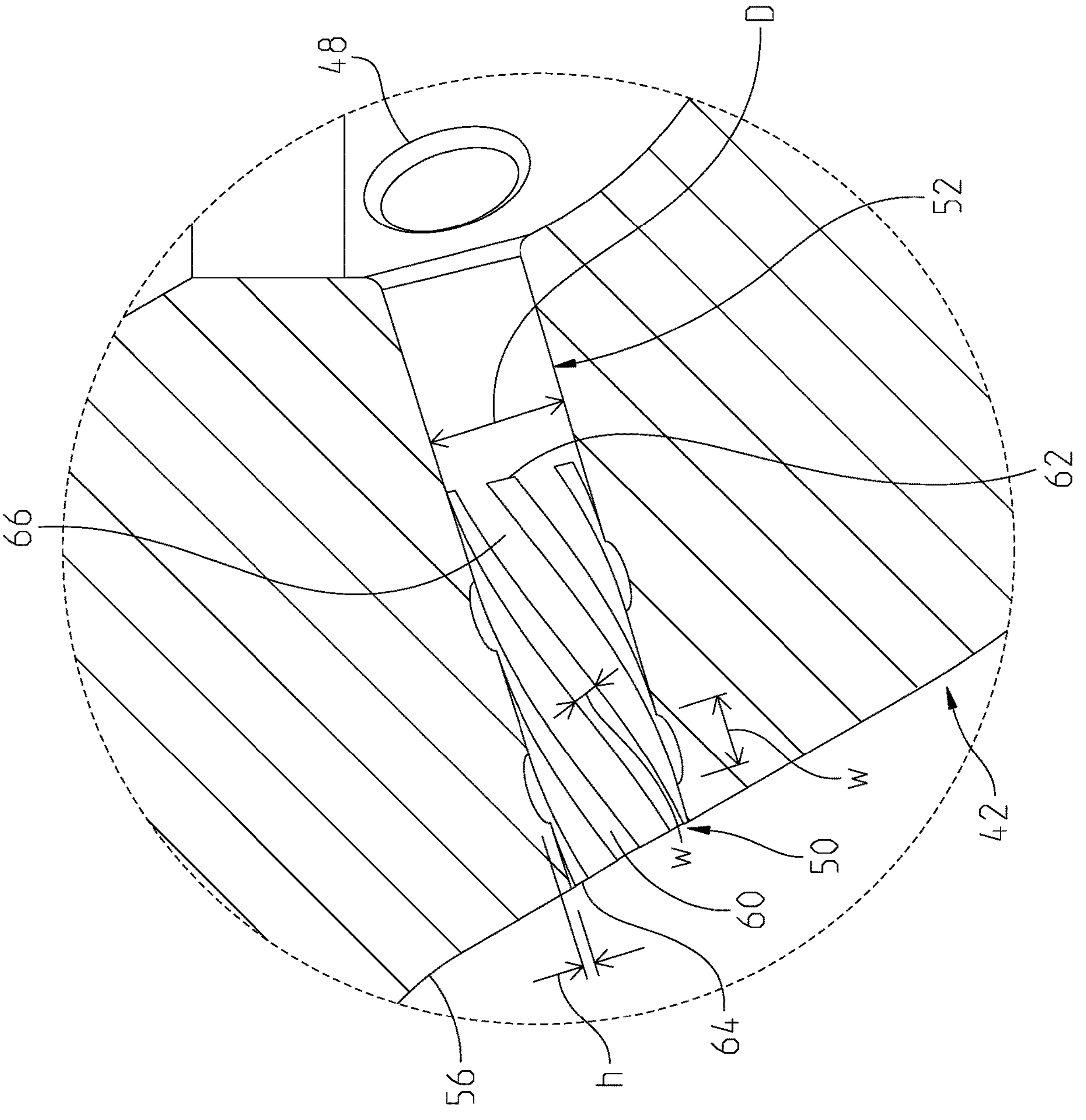
FIG. 4B is a detailed cross-sectional view of the nozzle body of FIG. 3 illustrating an alternative configuration of the plurality of grooves of FIG. 4A.

FIG. 4B discloses that grooves 60 of FIGS. 3 and 4A may extend along a partial length of channel 52 such that first end 62 of each groove 60 is spaced apart from inlet 48 of spray hole 40. More particularly, first end 62 is spaced laterally outward from inlet 48 of spray hole 40. Illustratively, second end 64 of each groove 60 is coplanar with outlet 50 of spray hole, however, in other embodiments, second 64 of each groove 60 may be spaced apart from outlet 50.

Figure 5:
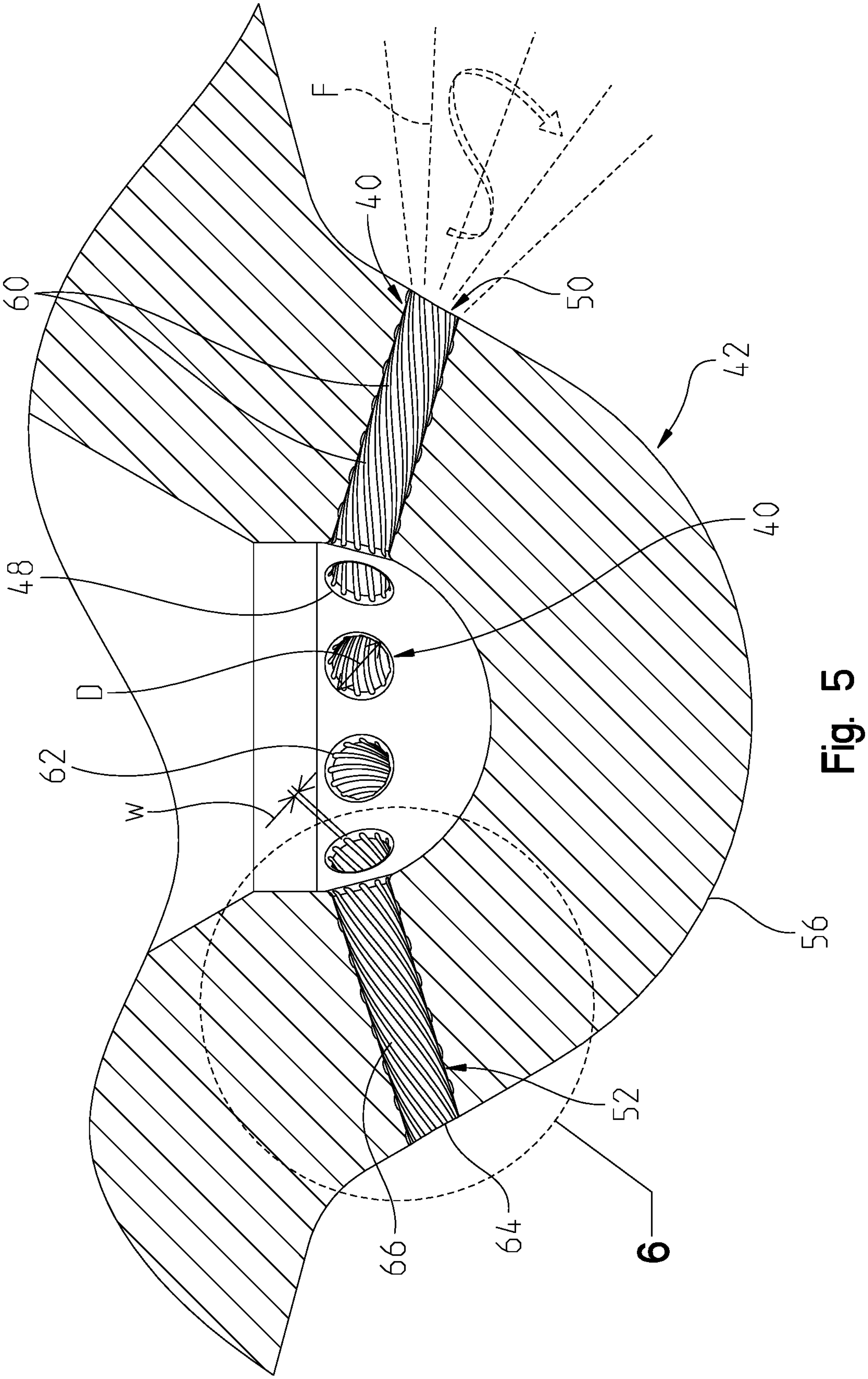
FIG. 5 is a cross-sectional view of the lower portion of the nozzle body of FIG. 2 illustrating a plurality of spray holes having an alternative configuration of grooves.
Figure 6:
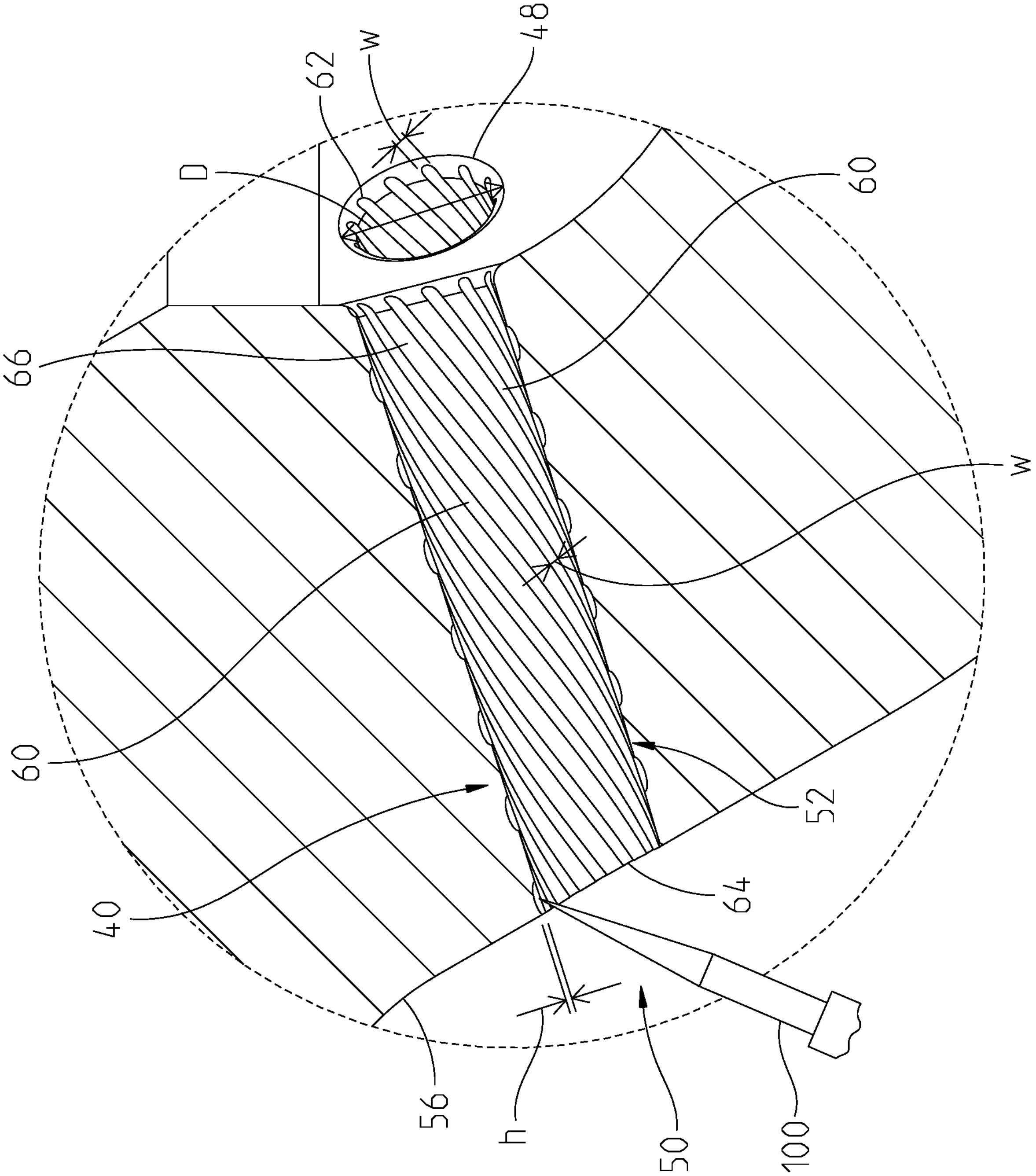
FIG. 6 is a detailed cross-sectional view of the configuration of grooves of FIG. 5.

FIGS. 5 and 6 disclose a second embodiment of grooves 60. In one embodiment, grooves 60 extend along the entire length of channel 52 such that first end 62 of each groove 60 is generally coplanar with inlet 48 of spray hole 40 and second end 64 of each groove 60 is generally coplanar with outlet 50 of spray hole 40. In this embodiment, at least 12 grooves 60 are defined along channel 52 such that spray hole 40 defines at least 12 grooves 60 per 360°. The distance or height h of each groove 60 may be approximately 30-100 μm and, illustratively, may be approximately 60 μm. Additionally, width w of each groove 60 may be approximately 5-20 μm and, illustratively, may be approximately 10 μm. The pitch of grooves 60 of FIGS. 5 and 6 may be approximately 1.8 mm.

Figure 7:
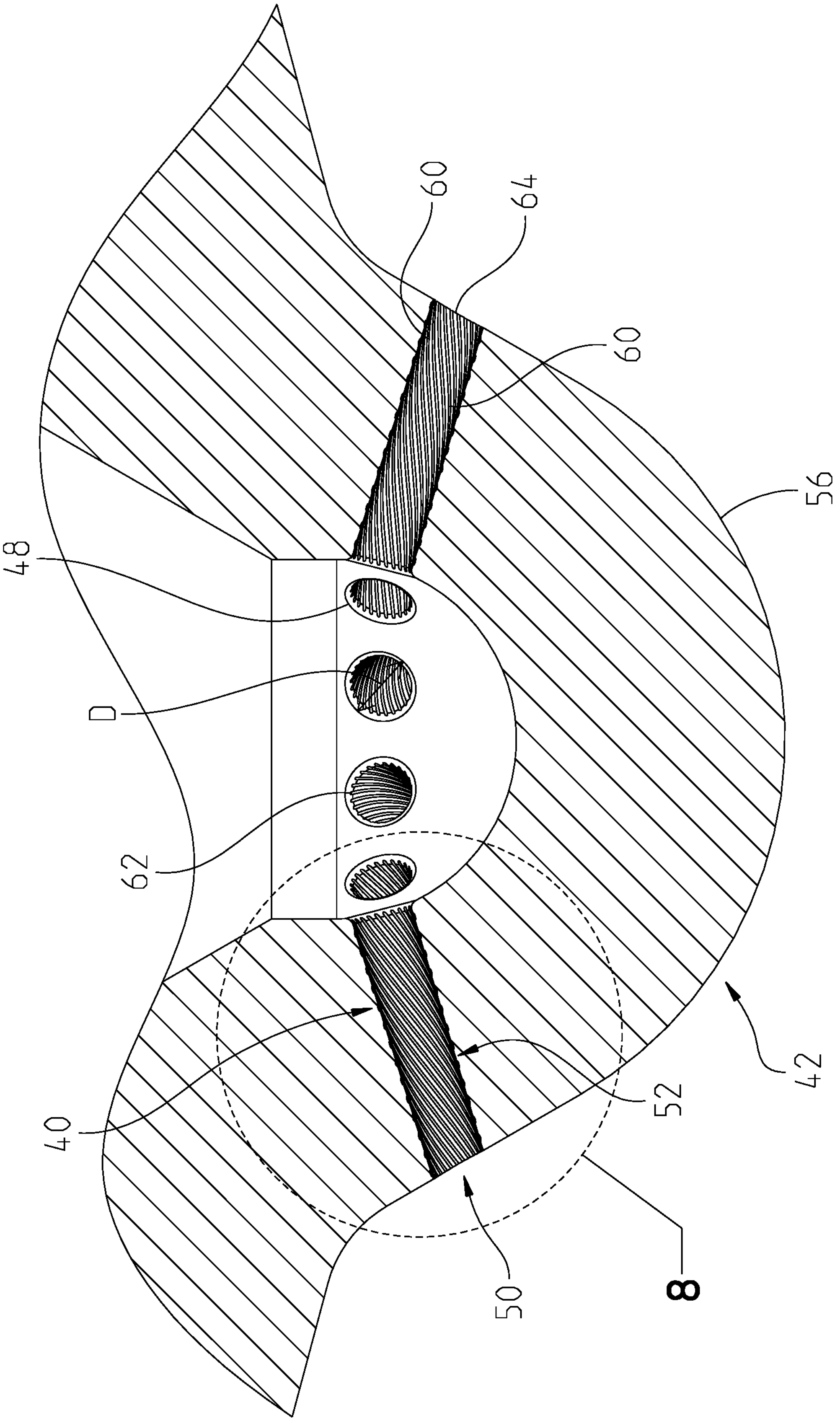
FIG. 7 is a cross-sectional view of the lower portion of the nozzle body of FIG. 2 illustrating a plurality of spray holes having an alternative configuration of grooves.
Figure 8:
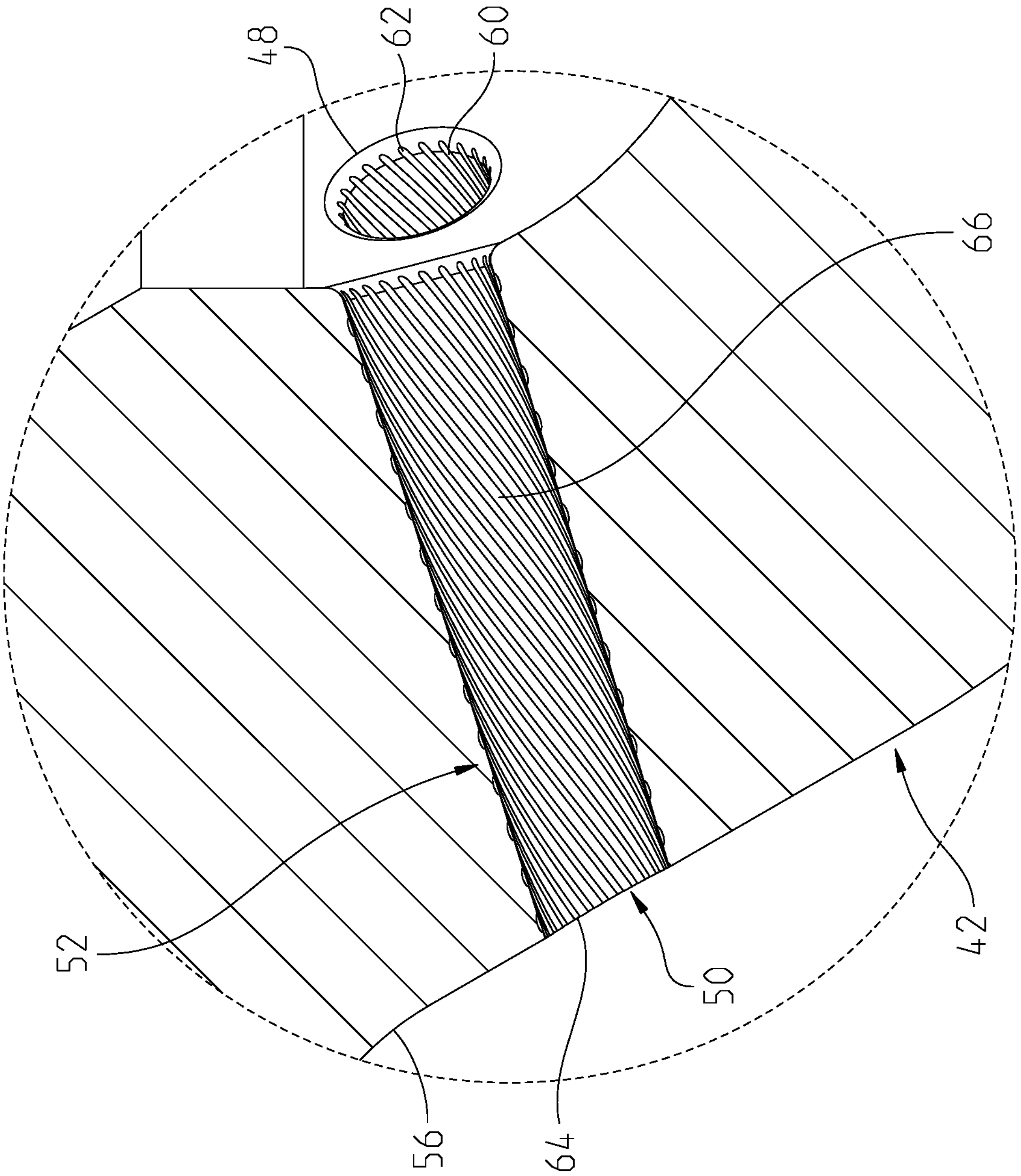
FIG. 8 is a detailed cross-sectional view of the configuration of grooves of FIG. 7.

FIGS. 7 and 8 disclose a third embodiment of grooves 60. Grooves 60 extend along the entire length of channel 52 such that first end 62 of each groove 60 is generally coplanar with inlet 48 of spray hole 40 and second end 64 of each groove 60 is generally coplanar with outlet 50 of spray hole 40. However, in other embodiments, grooves 60 extend along only a portion of channel 52. In this embodiment, at least 24 grooves 60 are defined along channel 52 such that spray hole 40 defines at least 24 grooves 60 per 360°. The distance or height h of each groove 60 may be approximately 10-50 μm and, illustratively, may be approximately 30 μm. Additionally, width w of each groove 60 may be approximately 2-10 μm and, illustratively, may be approximately 5 μm. The pitch of grooves 60 of FIGS. 5 and 6 may be approximately 1.8 mm.

Figure 9:
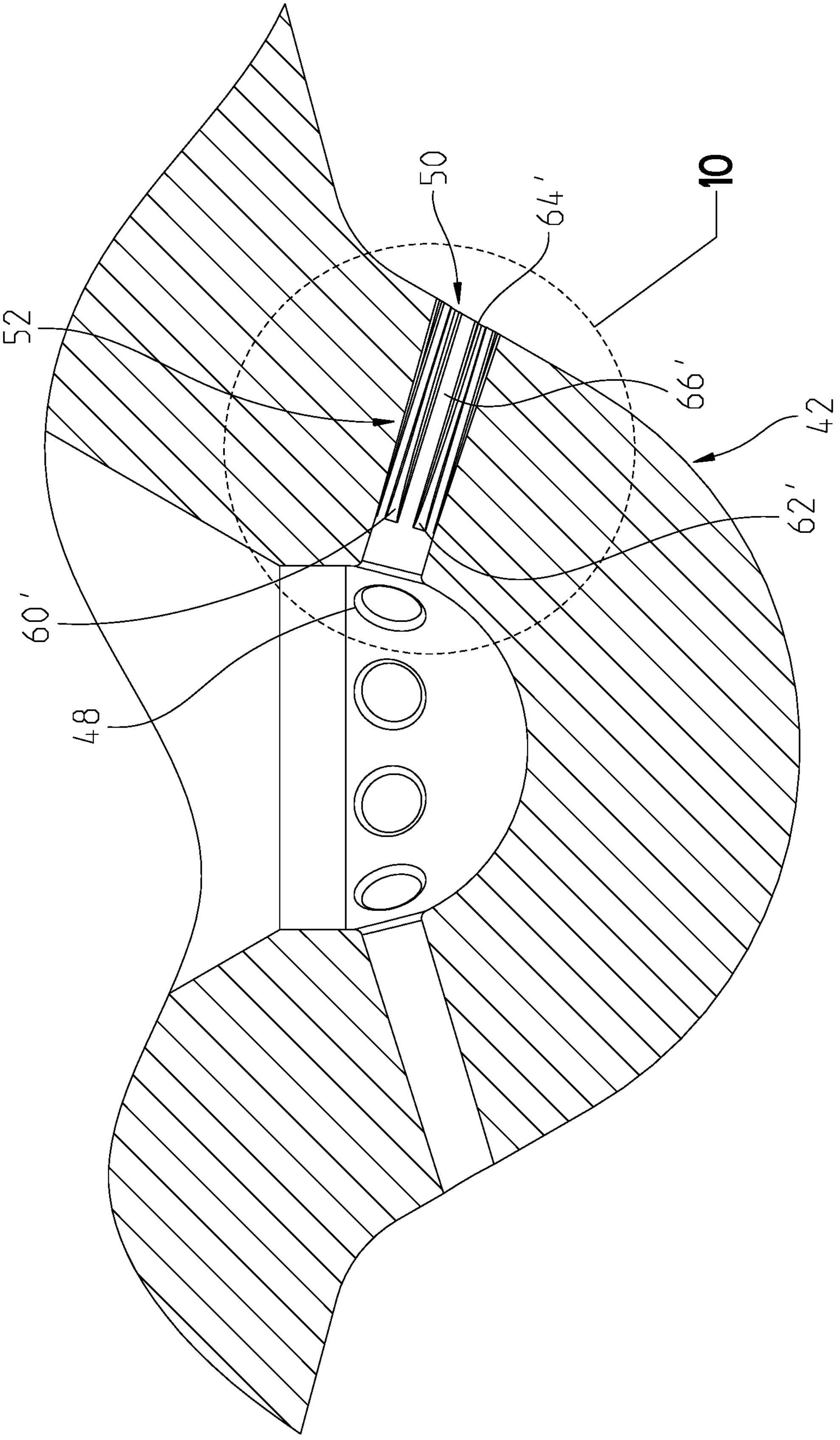
FIG. 9 is a cross-sectional view of the lower portion of the nozzle body of FIG. 2 illustrating a plurality of spray holes having an alternative configuration of grooves.
Figure 10:
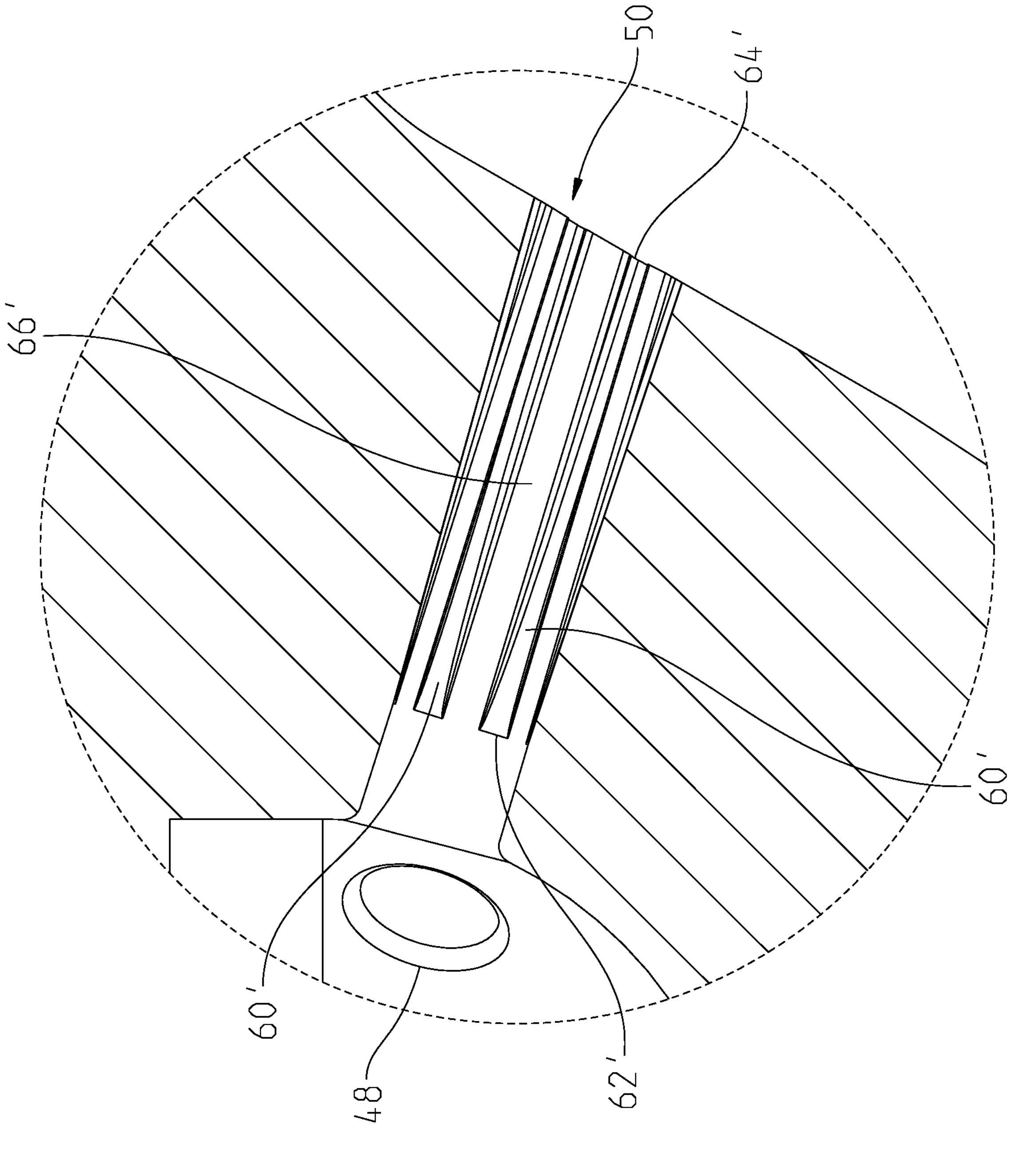
FIG. 10 is a detailed cross-sectional view of the configuration of grooves of FIG. 9.

FIGS. 9 and 10 disclose a fourth embodiment of the grooves disclosed herein. More particularly, at least one spray hole 40 may include at least one groove 60'. Unlike grooves 60 of FIGS. 3-8, each of grooves 60' has a generally linear configuration extending between a first end 62' and a second end 64'. Illustratively, first end 62' is spaced apart from inlet 48 of spray hole 40 and second end 64' is coplanar with outlet 50 of spray hole 40. In this way, the length of grooves 60' is less than a length of channel 52 of spray hole 40. However, in other embodiments, the length of groove 60' may be approximately equal to the length of spray hole 40. A land 66' may be defined as the non-recessed portion between each groove 60'. In the embodiment of FIGS. 9 and 10, approximately 6-24 grooves 60' may be present.

Grooves 60 and 60', as disclosed herein in FIGS. 3-10, affect the flow of the fluid being output by spray holes 40 by causing the fluid to flow in a manner that better mixes with other fluid(s) (e.g., air). When grooves 60, 60' are part of fuel injector 30, grooves 60, 60' improve mixing between the fluid and combustion air such that the fuel/air mixture, or charge, combusts or burns more efficiently for optimum operation of engine 10. Without grooves 60 or 60', fluid would exit spray holes 40 in a laminar or smooth slow and, therefore, the fluid may not fully mix with the air before combustion of engine 10. More particularly, with respect to grooves 60 of FIGS. 3-8, the helical configuration of grooves 60 imparts or induces a rotational flow to the fluid flowing through spray holes 40. As shown best in FIG. 5, fluid F is configured to rotate in the direction of arrows upon exiting spray hole 40 because fluid F flows within grooves 60 while flowing through spray holes 40 and the helical configuration or pattern of grooves 60 imparts the rotational movement or flow on fluid F. This rotation flow of fluid F allows fluid F to mix efficiently with air to improve combustion of engine 10.

Additionally, with respect to grooves 60' of FIGS. 9 and 10, while grooves 60' do not impart a rotational flow on fluid F, grooves 60' still encourage better mixing of air with the fluid F (FIG. 5). More particularly, as the fluid F flows through grooves 60 while flowing in spray holes 40, grooves 40' break up or interrupt the initial laminar flow of fluid F and this unsmooth or non-laminar flow of fluid F allows fluid F to mix efficiently with air to improve combustion of engine 10.

To form grooves 60, various methods may be used. More particularly, simultaneously with or subsequent to the formation of spray holes 40 within nozzle sac 42, grooves 60, 60' may be formed. In one embodiment, heat may be used to form grooves 60, 60'. For example, a laser method, such as laser drilling, may be used to form grooves 60, 60' along an inner surface of spray holes 40. In such a method, a laser device 100 (see FIG. 6) may be configured to apply heat to burn grooves 60, 60' into nozzle sac 42. A laser drilling method is sufficiently precise to form grooves 60, 60' in the helical or linear configurations disclosed herein and according to the parameters, such as width, height, pitch, and groove count, also disclosed herein. Additionally, a laser drilling method is able to produce grooves 60, 60' which are not parallel with longitudinal axis L of injector 30, as shown herein. Known methods of forming spray holes 40, such as electrical discharge machining ("EDM"), may not be able to produce a helical or spiral groove pattern in a spray hole having such a small diameter (e.g., 100-300 μm).

While this invention has been described as having an exemplary design, the present invention may be further modified within the spirit and scope of this disclosure. For example, while the present disclosure refers to spray hole drillings for a fuel injector, the disclosure is applicable to any type of injector or doser, such as a urea doser, and is applicable and may be used with any type of internal drilling within an injector, doser, any part of a fuel or fluid system, or the like, such as the drillings for a valve seat or any other internal drilling for an injector or any part of a fuel or fluid system. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of forming a portion of a nozzle for an injector, comprising:

forming at least one spray hole within the nozzle, the at least one spray hole having a length extending from an inlet end located within the nozzle to an outlet end located on an outer surface of the nozzle, and the at least one spray hole having an inner surface forming a channel extending along the length from the inlet end to the outlet end; and forming a plurality of grooves in the inner surface of the at least one spray hole so that each of the plurality of grooves defines a recessed portion of the channel that extends in a helical configuration, each of the plurality of grooves being formed in the inner surface to extend in the helical configuration from a first end to a second end thereof so that each of the plurality of grooves extends along only a portion of the length of the at least one spray hole and less than a full rotation about the at least one spray hole, and the plurality of grooves are separated from one another by a plurality of lands that form non-recessed portions of the channel, each of the plurality of lands extending in a helical configuration from a first end thereof at the first ends of adjacent ones of the plurality of grooves to a second end thereof at the second ends of the adjacent ones of the plurality of grooves, wherein the helical configuration of each of the plurality of grooves is configured to induce a rotational flow to fluid flowing through the at least one spray hole.

2. The method of claim 1, wherein forming the plurality of grooves includes applying heat using a laser to form the plurality of grooves.

3. The method of claim 1, wherein each of the plurality of grooves extends to the outlet end of the at least one spray hole.

4. The method of claim 1, further comprising applying heat to form at least twelve grooves in the helical configuration along the inner surface of the at least one spray hole.

5. An injector, comprising:

a nozzle body; and at least one spray hole extending through a portion of the nozzle body and configured to output a fluid from the nozzle body, the at least one spray hole having a length extending outwardly from an inlet end located within the nozzle body to an outlet end located on an outer surface of the nozzle body, the at least one spray hole including an inner surface forming a channel extending along the length from the inlet end to the outlet end, and the at least one spray hole includes a plurality of grooves formed in the inner surface and spaced from at least one of the inlet end and the outlet end so that each of the plurality of grooves defines a recessed portion of the channel that extends in a helical configuration, each of the plurality of grooves extending in the helical configuration from a first end to a second end thereof so that each of the plurality of grooves extends along only a portion of the length of the at least one spray hole and less than a full rotation about the at least one spray hole, and the plurality of grooves are separated from one another by a plurality of lands that form non-recessed portions of the channel, each of the plurality of lands extending in a helical configuration from a first end thereof at the first ends of adjacent ones of the plurality of grooves to a second end thereof at the second ends of the adjacent ones of the plurality of grooves, wherein the plurality of helical grooves are configured to induce a rotational flow to fluid flowing through the at least one spray hole.

6. The injector of claim 5, wherein the plurality of grooves includes at least four helical grooves that are evenly spaced about the at least one spray hole.

7. The injector of claim 5, wherein each spray hole includes twenty-four helical grooves.

8. The helical grooves of claim 5, wherein the at least one spray hole includes at least twelve helical grooves.

9. The injector of claim 5, wherein each of the plurality of grooves is defined by a cross-sectional height, and the cross-sectional height is approximately 10-150 microns.

10. The injector of claim 5, wherein each of the plurality of grooves extends to the outlet end of the at least one spray hole.

11. An injector, comprising:

a nozzle body;

a plurality of spray holes disposed within the nozzle body, each of the plurality of spray holes having a length and an inner surface forming a channel along the length extending outwardly from an inlet end located within the nozzle body to an outlet end located on an outer surface of the nozzle body; and a plurality of rounded grooves disposed in the inner surface of at least one of the plurality of spray holes, the plurality of rounded grooves spaced from at least one of the inlet end and the outlet end so that each of the plurality of rounded grooves defines a recessed portion of the channel that extends in a helical configuration, each of the plurality of rounded grooves being formed in the inner surface to extend in the helical configuration from a first end to a second end thereof so that of each of the plurality of rounded grooves extends along only a portion of the length of the at least one of the plurality of spray holes and less than a full rotation about the at least one spray hole, and the plurality of grooves are separated from one another by a plurality of lands that form non-recessed portions of the channel, each of the plurality of lands extending in a helical configuration from a first end thereof at the first ends of adjacent ones of the plurality of grooves to a second end thereof at the second ends of the adjacent ones of the plurality of grooves, wherein the helical configuration of each of the plurality of rounded is configured to induce a rotational flow to fluid flowing through the at least one spray hole.

12. The injector of claim 11, wherein the plurality of rounded grooves are evenly spaced about the at least one of the plurality of spray holes.

13. The injector of claim 11, wherein the plurality of rounded grooves includes twenty-four grooves.

14. The injector of claim 11, wherein the plurality of rounded grooves includes at least twelve grooves.

15. The injector of claim 11, wherein each of the plurality of rounded grooves is defined by a cross-sectional width, and the cross-sectional width is approximately 2-50 microns.

16. The injector of claim 11, wherein each of the plurality of rounded grooves extends to the outlet end of the at least one of the plurality of spray holes.

17. The injector of claim 11, wherein each of the plurality of rounded grooves has a pitch of approximately 1.0-3.0 mm.

18. The injector of claim 17, wherein the pitch is approximately 1.8 mm.

* * * * *